United States Statutory Invention Registration [19]

[11] Reg. Number: H797

Keown, deceased et al. [43] Published: Jul. 3, 1990

[54] LONG ROD PENETRATOR WITH SEVERABLE GUIDE FINS

[76] Inventors: William P. Keown, deceased, late of West Milford, N.J.; by Evelyn Keown, executrix, 15 Hiawatha Pass, West Milford, N.J. 07480; Walter J. Huckaby, P.O. Box 1057, Latrobe, Pa. 15650

[21] Appl. No.: 355,621

[22] Filed: May 2, 1989

[51] Int. Cl.[5] ..... F42B 10/06

[52] U.S. Cl. ..... 244/3.25; 102/517

*Primary Examiner*—Charles T. Jordan
*Assistant Examiner*—Michael J. Carone

[57] ABSTRACT

A long rod penetrator has a severable guide fin assembly which is severably attached to the long rod and is sheared from the long rod when the fins reach the surface of the armor being penetrated by the long rod. The shear force required to sever the fins from the long rod is the minimum force necessary to ensure that the fins remain attached to the long rod during the firing of the long rod penetrator and its movement toward a target.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

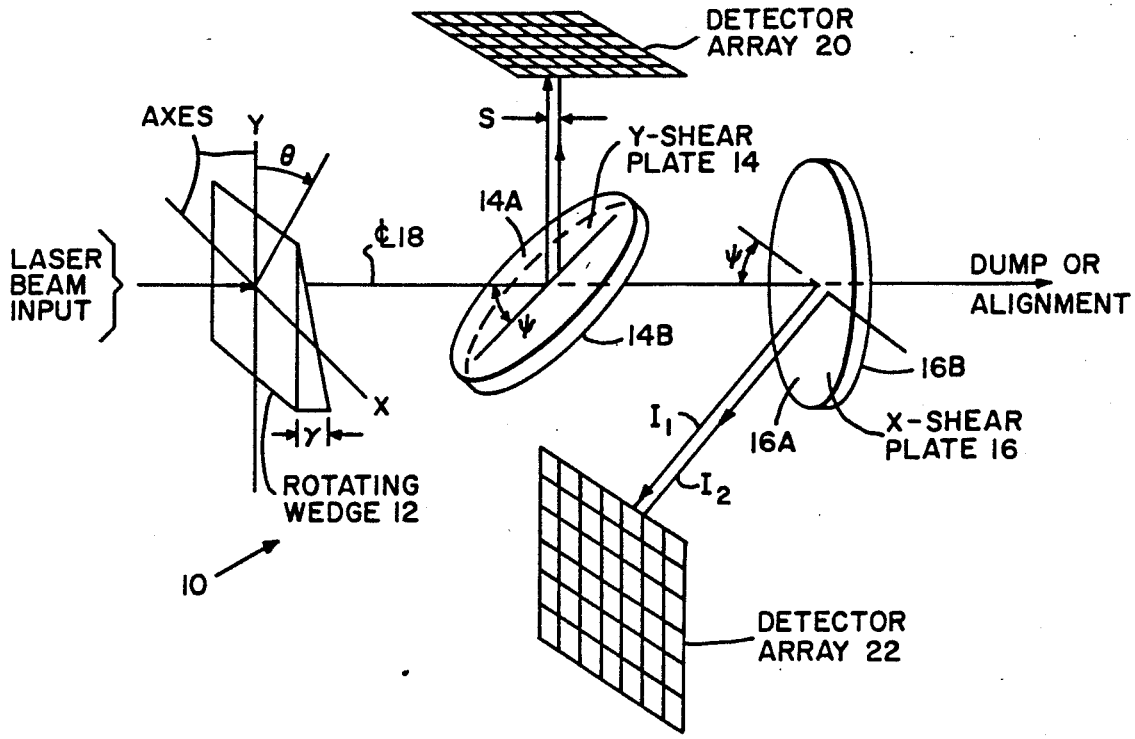

LONG ROD PENETRATOR WITH SEVERABLE GUIDE FINS

GOVERNMENT INTEREST

The invention described herein may be manufactured, used and licensed by or for the Government for Governmental purposes without payment to us of any royalties thereon.

BACKGROUND OF THE INVENTION

This invention relates to long rod penetrators, and more specifically relates to a novel structure for severably securing guide fins to a long rod body so that the guide fins are sheared from the body with a minimum reduction in penetrating force of the long rod as it penetrates armor.

Long rod penetrators are well known and are adapted to penetrate armor. Long rod penetrators have stabilizing fins which are either welded to the penetrator rod or threadably fixed to the penetrator rod. Such stabilizing fins are necessary to guide the penetrator in true flight to the target. In conventional long rod penetrators, if armor is thick enough, it is possible that the long rod remains unpenetrated if the fins remain at least partly locked to the penetrator or are only partly sheared from the penetrator as the penetrator moves through the armor.

It would, of course, be desirable to reduce the retardation effect of the fins which may prevent the penetrator from moving as far through the armor as possible. This problem is intensified when using stronger ferrous type materials for the guide fins and penetrator rod to accommodate new propellants which expose the assembly to higher temperatures. Thus, armor is constantly being improved in toughness, hardness, obliquity and is being constructed in multilayer fashion. All of these changes require improvements in penetrators by increasing penetrating power and range. Such improvements are accomplished by adjustment of the length to the diameter ratio of the penetrator, the use of new material such as tungsten and depleted uranium, the use of new propellants, new sabots and new stabilizing fin structures and materials, therefore, and the like. The new propellants require the penetrator to withstand higher temperature in the gun tube since the rod and the guide fins are heated to higher temperatures. Consequently, stabilizing fins which conventionally were made from aluminum alloys are now being made of ferrous alloys which have much higher strength and are capable of withstanding higher temperatures.

When using aluminum alloys, the fins tended to shear readily from the penetrator body when the fins reached the surface of the armor being penetrated and did not produce a substantial retardation force against continued movement of the penetrator rod into their armor. However, higher strength stabilizing fins do not shear until a considerably higher force is applied between the rod body and the fin so that a substantial retardation force is present as the penetrator shaft enters the armor and the fins encounter the armor surface. In other words, a portion of the energy which propels the rod into the armor will be used up by "dragging" the fins through the rod cavity in the armor or in shearing or tearing the fin from the rod. As a result, the full impact energy of the rod is not used in accomplishing its primary objective of passing through a given armor thickness.

BRIEF DESCRIPTION OF THE INVENTION

In accordance with the present invention, the guide fins of a penetrator rod are formed on a separate housing which is intentionally severable from the penetrating rod by a minimum force which is sufficient to keep the fins fixed to the penetrator rod during firing of the penetrator rod and during its flight to the target. However, the severable connection permits relatively low force shearing or separation of the guide fins from the penetrator rod when the fins reach the armor surface being pierced.

In the preferred embodiment of the invention, the guide fin support structure has an internal, smooth, conically tapered surface which telescopes over and frictionally engages the smooth and conically shaped outer end surface of the penetrator rod, with the two tapers forming the same angle to the axis of the penetrator rod. A shear pin structure can further couple the guiding assembly to the penetrator rod assembly to ensure that the two are fixedly held together during firing of the long rod penetrator and during its flight and that the assemblies are sheared apart only by the additional forces encountered when the penetrator rod penetrates a target and the fin assembly reaches the surface of the target.

Other features and advantages of the present invention will become apparent from the following description of the invention which refers to the accompanying drawings.

BRIEF DESCRIPTION OF THE DRAWINGS

FIG. 3 is an end view of the left-hand end of the long rod penetrator of FIG. 1.

DETAILED DESCRIPTION OF THE INVENTION

In accordance with the present invention, the fin structure of a long rod penetrator which may be of a ferrous material is connected to the main penetrator rod by an intentionally severable connection which severs with a minimum force when the rod enters armor to a depth at which the fins come into contact with the armor surface.

Figure 1:
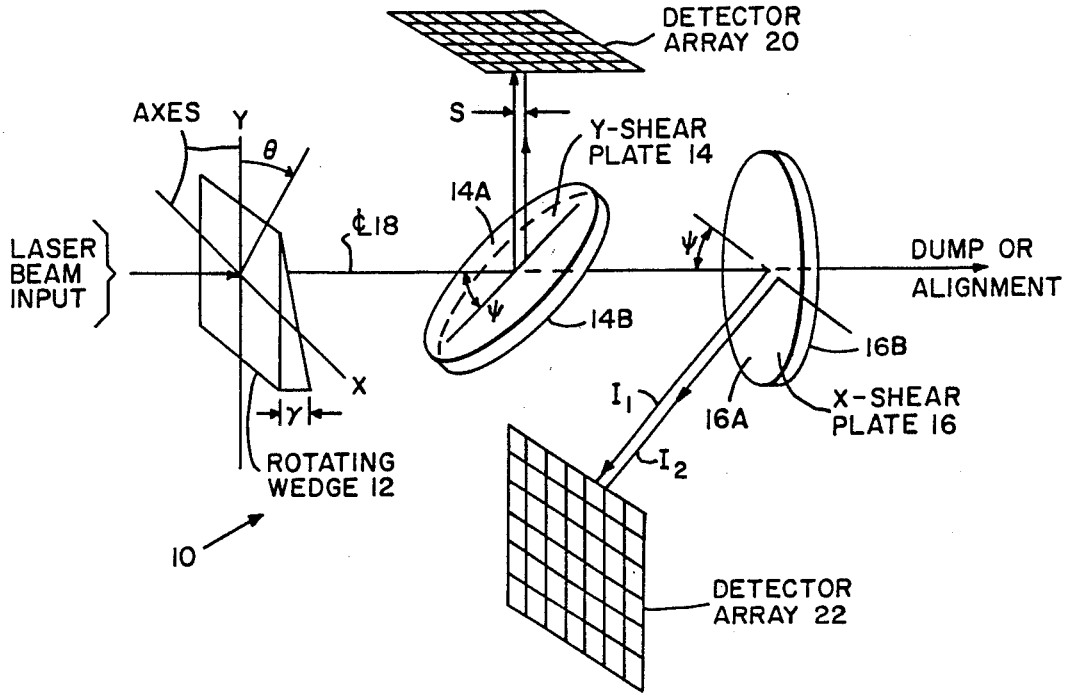
FIG. 1 is a side elevational view of a long rod penetrator which employs the present invention.
Figure 2:
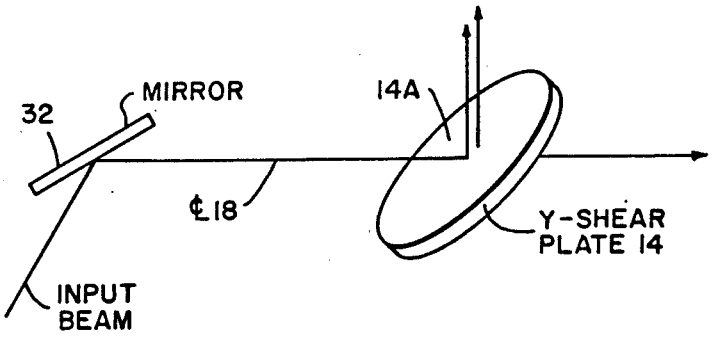
FIG. 2 is an enlarged view partly in cross-section of the region "A" circled in FIG. 1.

FIG. 1 shows a long rod penetrator 10 containing the novel severable guide fin means or fin assembly 11 of the invention which is severably attached to the main rod 12. As shown in FIG. 2, the guide fin means 11 consists of a central metal tube 13 having fins 14, 15, 16 and 17 (FIG. 3) extending therefrom. Fins 14, 15 and 16 are of the same material as tube 13 and can be welded or otherwise fixed thereto.

In accordance with an important feature of the invention, the tube 13 has a smooth, tapered conical surface 18 which is forced into a tight friction fit with a corresponding smooth, tapered surface 19 of the end of rod 12. Surfaces 18 and 19 are tapered in corresponding directions and to the same relatively shallow angle, with the angle directed such that the coaxial bodies 11 and 12 will be axially separated when appropriate forces are applied between them.

In addition to the tight friction fit at surfaces 18 and 19, a novel shear pin structure 20 is provided. Shear pin 20 is made of suitable diameter and material, for example of the same material as is used for assembly 11, and extends through aligned openings in members 12 and 13 and is secured in place by welding or bolting or the like.

FIG. 2 shows one end of a snap washer 21 which holds the shear pin 20 in position. The friction fit between surfaces 18 and 19 and the shear pin 20 are designed to have sufficient strength to hold assembly 11 together with rod 12 during the firing of the long rod penetrator and during its travel toward a target. However, when the long rod penetrator reaches and penetrates an armored surface to a depth sufficient that the fin assembly 11 reaches the armored surface, the impact force applied to assembly 11 is easily sufficient to overcome the friction fit between members 12 and 13 and to shear the pin 20 so that the rod 12 can continue its penetration without the additional drag of the fins.

The foregoing disclosure and drawings are merely illustrative of the principles of this invention and are not to be interpreted in a limiting sense. We wish it to be understood that we do not desire to be limited to the exact details of construction shown and described because obvious modifications will occur to a person skilled in the art.

What is claimed is:

1. A long rod penetrator comprising an elongated rod having an armor piercing end and a rear end, guiding fin means including fins connected to a fin support positioned on said rear end of said rod and severable attachment means for attaching guiding fin means to said rod whereby said guiding fin means is fixedly secured to said rod during propulsion and travel of said rod toward a target, but is severed from said rod when said rod penetrates armor and said guiding fin means reaches said armor without requiring severance of said fins from said fin support.

2. The long rod penetrator of claim 1 wherein said fin support and said elongated rod frictionally engage one another over respective conical surfaces to permit axial separation of said elongated rod and said fin support in the presence of a force greater than a given value.

3. The long rod penetrator of claim 1 wherein said elongated rod and said fin support are coaxial with one another.

4. The long rod penetrator of claim 3 wherein said fin support and said elongated rod frictionally engage one another over respective conical surfaces which permit axial separation of said elongated rod and said fin support in the presence of a given force tending to separate them.

5. The long rod penetrator of claim 1 wherein said severable attachment means includes a shear pin extending through and connecting said elongated rod and said fin support; said shear pin being sheared when said guiding fin means reaches the surface of armor penetrated by said elongated rod.

6. The long rod penetrator of claim 5 wherein said elongated rod and fin support are coaxial with one another.

7. The long rod penetrator of claim 4 wherein said severable attachment means includes a shear pin extending through and connecting said elongated rod and said guiding fin means; said shear pin being sheared when said guiding fin means reaches the surface of armor penetrated by said elongated rod.

8. The long rod penetrator of claim 3 wherein said fin support comprises a central cylindrical support member which is coaxial with said elongated rod; said fins extending radially from the outer surface of said central support member.

9. The long rod penetrator of claim 8 wherein said fin support and said elongated rod frictionally engage one another over respective conical surfaces which permit axial separation of said elongated rod and said fin support in the presence of a given force tending to separate them.

10. The long rod penetrator of claim 8 wherein said severable attachment means includes a shear pin extending through and connecting said elongated rod and said fin support; said shear pin being sheared when said fins reach the surface of armor penetrated by said elongated rod.

* * * * *